Jan. 12, 1971   R. VAN DER VEEN   3,554,011
METHOD AND DEVICE FOR DETERMINING THE CONVEY CONCENTRATION OF
DREDGING SPOIL OF A SUSPENSION OF DREDGING SPOIL AND WATER
Filed April 21, 1969

INVENTOR
ROMKE van der VEEN
BY *E.J. Kahl*
ATTORNEY

United States Patent Office 3,554,011
Patented Jan. 12, 1971

3,554,011
METHOD AND DEVICE FOR DETERMINING THE CONVEY CONCENTRATION OF DREDGING SPOIL OF A SUSPENSION OF DREDGING SPOIL AND WATER
Romke van der Veen, Jutphaas, Netherlands, assignor to N.V. Ingenieursbureau voor Systemen en Octrooien "Spanstaal," Rotterdam, Netherlands, a Dutch contracting company
Filed Apr. 21, 1969, Ser. No. 817,999
Claims priority, application Netherlands, Apr. 24, 1968, 6805779
Int. Cl. G01n 15/06, 9/26
U.S. Cl. 73—61　　　　　　　　　　　　　　　4 Claims

ABSTRACT OF THE DISCLOSURE

A system for measuring the concentration of a dredging spoil suspension wherein the suspension is caused to flow vertically upwards and vertically downwards in two pipe sections. Upper and lower conduits are coupled between corresponding upper and lower points on the two vertical pipe sections, and a pressure pickup is obtained between the midpoints of the upper and lower conduit.

---

The present invention relates to a method and an apparatus for measuring the quantity of dredging spoil, or the like.

With nearly each contracted dredging- or raise-work the quantity of digged or displaced material is the basis, on which the cost for the work is settled. This is mostly an amount of money agreed upon in advance, based on the volume on the weight of dredging spoil. For such a settlement it is important that the quantity of dredging spoil be measured accurately. A method and apparatus highly suitable for this purpose are disclosed in a copending application, Ser. No. 817,691, filed on even date herewith and assigned to the assignee of the present application.

It is further important in the pumping a suspension of dredging spoil and water through a pipe, to know the convey concentration of dredging spoil working, in order to be able to convey the dredging spoil in the most economic way without the risk of stopping the pipe.

It is an object of the invention to improve the method of determining the convey concentration of dredging spoil in a flow of a suspension of dredging spoil and water.

It is a further object of the invention to provide a particularly simple method. Which is moreover more accurate. To that aim the invention provides a method of determining the convey concentration of dredging spoil in a flow of a suspension of dredging spoil and water, wherein the flow is guided mainly vertically upwards along a first flow section and mainly vertically downwards along a second flow section.

The convey concentration of dredging spoil in the suspension is derived from at least one pressure difference between two vertically spaced measuring points of the first flow section and at least one pressure difference between two vertically spaced measuring points of the second flow section.

An upper and a lower measuring point of the first flow section are connected with an upper and lower measuring point respectively of the second flow section by means of a relatively narrow upper and lower conduit respectively, and the pressure difference between the middles of the upper and lower conduits is picked up.

With the method according to the invention less picking up fault of a pressure difference pickup is introduced, while moreover the indeed small fault of an adding unit comprising an amplifier, cancels out.

The invention provides also a simple measuring device for determining the convey concentration of dredging spoil of a suspension of mainly dredging spoil and water flowing through a pipe, wherein a first pipe fraction conveys the flow mainly vertically upwards and a second pipe fraction conveys the flow mainly vertically downwards.

An upper and a lower conduit connect the tops and bottoms respectively of said pipe fractions, and a pressure difference pickup for measuring the pressure difference is provided between the middles of the upper and lower conduit.

The measuring device according to the invention requires one less pickup and one adding unit comprising an amplifier as compared to comparable prior art measuring devices.

The mentioned and other features of the invention will be elucidated in the following description with reference to the accompanying drawing in which.

Figure 1:
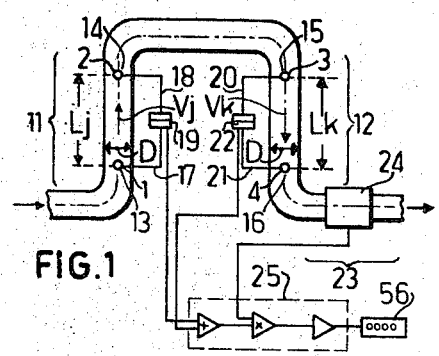
FIGS. 1 and 3 are schematic diagrams of systems for measuring the quantity of a suspension of dredging spoil.
Figure 2:
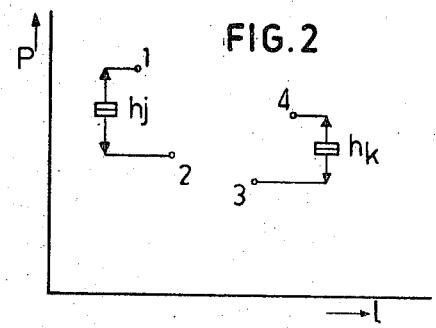
FIGS. 2 and 4 are pressure diagrams illustrating the pressures at specified points of the systems of FIGS. 1 and 3, respectively.
Figure 3:
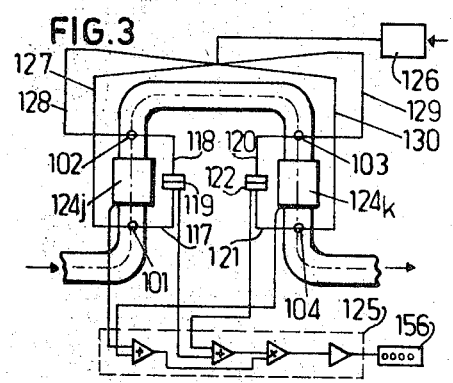
Figure 4:
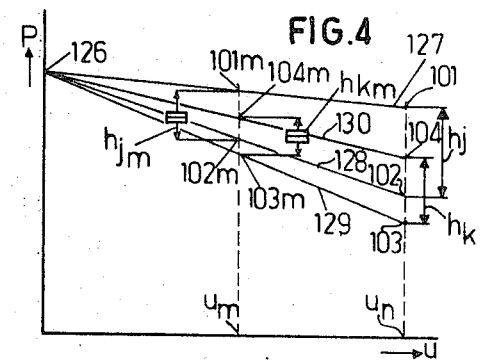
Figure 5:
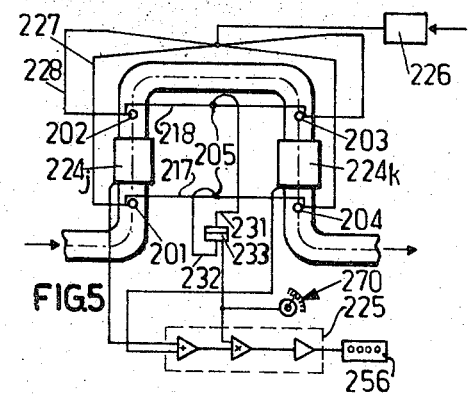
Figure 6:
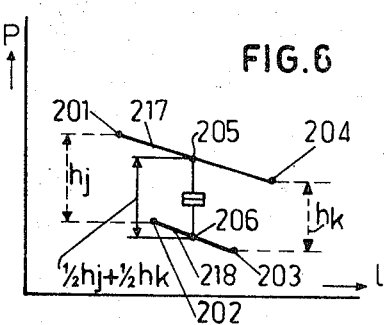
Figure 7:
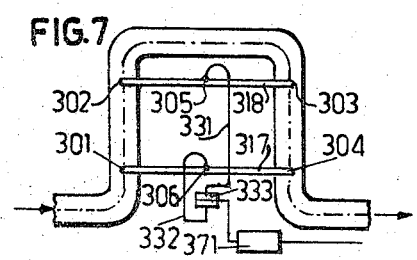
Figure 8:
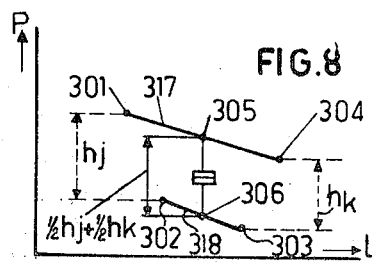

FIGS. 5 and 7 illustrate two modifications of the systems of FIGS. 1 and 3 illustrating the features of the present invention; and FIGS. 6 and 8 are pressure diagrams similar to FIGS. 2 and 4 illustrating the pressures at specified points of the systems of FIGS. 5 and 7, respectively.

Corresponding elements of the four represented embodiments are provided with the same reference numbers, on the understanding that the reference numbers of the elements of the second, third and fourth embodiment are each time increased by 100 relative to the reference numbers of the corresponding elements of the preceding embodiment.

As is shown in FIG. 1, a measuring section is incorporated in a pipe, through which a suspension of dredging spoil and water flows, which measuring section has the shape of a reversed U with vertical legs. A pipe fraction $j$ which conveys the suspension vertically upwards and a pipe fraction $k$ which conveys the suspension vertically downwards are thus created.

For measuring the convey concentration of dredging spoil in the suspension, connections 13, 14, 15 and 16, respectively, are provided in the measuring section at the indicated measuring points 1, 2, 3, and 4. The connections 13 and 14 are connected by means of conduits 17 and 18 with the opposite sides of a pressure pickup 19 for picking up the difference between the pressure in the fraction $j$ at the measuring point 1 and that at the measuring point 2.

In the same way the connections 15 and 16 are connected by means of conduits 20 and 21 with the opposite sides of a pressure pickup 22 for picking up the difference between the pressure in the fraction $k$ at the measuring point 3 and that at the measuring point 4.

Further, a velocity meter 24 known by itself is provided in a horizontal pipe fraction 23, which velocity meter 24 works for example on the basis of an unhomogeous magnetic field.

As more completely described in said copending application, the measured values of the pressure pickups 19 and 22 are added by means of a calculating machine 25 and multiplied by the measured value of the velocity meter 24.

This product is integrated over the total flow time and registrated on a counter 56.

The pressures of the measuring points and the measured pressure differences $h_j$ of the fraction $j$ and $h_k$ of the fraction $k$ are shown in FIG. 2.

For $h_j$ and $h_k$ the following equations are:

$$h_j = L_j(S_j + C_j \cdot V_j^2), \text{ and}$$

$$h_k = L_k(S_k + C_k \cdot V_k^2)$$

in which the symbols represent:

$L_j$ and $L_k$ the length of the pipe between the measuring points 1 and 2 and that between the measuring points 3 and 4, respectively;

$S_j$ and $S_k$ the specific gravity of the suspension in the fractions $j$ and $k$ respectively;

$V_j$ and $V_k$ the flow velocity of the suspension in the fractions $j$ and $k$, respectively, and $C_j$ and $C_k$ constant values relating to the flow resistance. When the fractions $j$ and $k$ are identical then: $C_j = C_k$. Equal diameters of the fractions $j$ and $k$ give: $V_j = V_k$.

$$h_j/L_j = S_j + C_j \cdot V_j^2$$

$$h_k/L_k = S_k - C_k \cdot V_k^2$$

$$h_j/L_j + h_k/L_k = S_j + S_k$$

When adding up the terms $h_j/L_j$ and $h_k/L_k$ the terms relating to the flow resistances cancel out. The percentage of the volume of dredging spoil in the suspension can be calculated from the specific gravity of the conveyed suspension, which is equal to the average of $S_j$ and $S_k$.

It is true, that the dredging spoil in the fraction $j$ tends to remain behind relative to the upward flow as a result of its larger specific gravity. This tendency however, is compensated in the fraction $k$ by the tendency of the dredging spoil to hurry on the downward flow as a result of the larger specific gravity. The volume concentration $C_v$ of dredging spoil in the suspension can be calculated as follows:

$\frac{1}{2}S_j + \frac{1}{2}S_k = 1 - C_v + C_v \cdot S_b$, wherein $S_b$ is the known specific gravity of the dredging spoil without empty spaces, which, for example, is equal to 2.65 kg./dm.$^3$. Then it follows from this equation:

$$1.65 C_v = (S_j + S_k - 2) \cdot 0.50$$

The weight on dredging spoil per dm.$^3$ suspension, indicated by $$G_b = 2.65\, C_v = (S_j + S_k - 2) \cdot 0.805$$

Multiplication of $G_b$ by the number of litres of conveyed suspension per second, gives the production $O_b$ in weight of dredging spoil/second.

$O_b = G_b \cdot A \cdot V_s$, wherein $V_s$ represents the velocity of the suspension measured by means of the velocity meter 24 and wherein A represents the flow surface of the velocity meter 24.

By the integration of $O_b$ over the flow time then during this time a completely delivered quantity of weight of dredging spoil is obtained. The measuring points 2 and 3, preferably, are arranged at the same level and the measuring section with the junction bends is completely symmetrical. With an interior pipe diameter of 60 cm. the vertical distance between the measuring points 1 and 2 is, for example, 4 m. Determining the average of the values $h_j/L_j$ and $h_k/L_k$ is easier, if $L_j = L_k$.

In order to prevent the landing of dredging spoil lands in the conduits 117, 118, 120 and 121, water is pumped as a purgative into the measuring section by means of a pump 126 through four mainly identical narrow purgative conduits 127, 128, 129 and 130, which conduits are connected to the connections 101, 102, 103 and 104, respectively (see FIG. 3).

The pressure reduction in the purgative conduits is shown in FIG. 4. If the pressures in the purgative conduits are measured on a pipe length $= U_m$ from the pump 126 and the total pipe length from the pump to the connections 101, 102, 103 and 104 is equal to $U_n$, then $h_j = h_{jm} \cdot U_n/U_m$ and $h_k = h_{km} \cdot U_n/U_m$.

For increasing the measuring accuracy the measuring points on the purgative conduits 127–130 are arranged close to the connections 101–104.

The flow velocity of the suspensions $V_s$ is preferably determined as shown in FIG. 3 by means of two velocity meters $124_j$ and $124_k$ instead of the single velocity meter as in the system illustrated in FIG. 1. With a velocity measurement in a horizontal fraction 23 of FIG. 1 measuring errors can arise, in that dredging spoil may deposit in this fraction, causing the flow diameter to decrease and an incorrect flow velocity to be measured. The deposit of dredging spoil is excluded in a vertical fraction. The problem occurs therewith that in an upward flow the water velocity is larger than in the downward flow, because the dredging spoil remains behind relative to the water in the first case and hurries forward relative to the water in the second. The measuring errors possibly resulting therefrom when picking up $V_j$ and $V_k$ are compensated by taking the average of $V_j$ and $V_k$. The system so far described is also disclosed in said copending application.

With the preferred embodiment of the measuring device according to the invention, which device is shown in FIG. 5 connections 202 and 203 are connected to each other by means of an upper conduit 218, while a tactile conduit 231 is provided between the middle 206 of upper conduit 218 and one side of a pressure difference pickup 233. In the same manner the connections 201 and 204 are connected to each other by means of a lower conduit 217 and a tactile conduit 232 is provided between the middle 205 of the lower conduit 217 and the other side of the pressure difference pickup 233. In this way only a single pressure difference pickup 233 measures a pressure difference which is equal to $\frac{1}{2}h_j + \frac{1}{2}h_k$ (see FIG. 6), so that an automatic adding and halving takes place. If a little dredging spoil should flow from the fraction $j$ into the conduits 218 and 217, this is no disadvantage. For this dredging spoil flows then through the conduits 218 and 217, respectively, into the fraction $k$. It cannot flow into the tactile conduits 231 and 232, respectively, because these conduits extend first upwards from the connecting points 206 and 205, respectively. The measurement system according to FIG. 5 has besides the advantage that an additional pickup and an electric adding unit is unnecessary, the advantage, that a reduced picking up error less is introduced as a result of the picking up by means of only one pressure difference pickup instead of by means of two pressure difference pickups.

The output of the pressure difference pickup 233 is connected to the calculating machine 225, as well as to an indicator 270 for indicating the specific gravity of the conveyed suspension or for indicating the convey concentration of dredging spoil in this suspension.

The measuring device according to the invention shown in FIG. 7, is not provided with purgative conduits. In that embodiment an upper conduit 318 and a lower conduit 317 connect the measuring point 302 to the measuring point 303 and the measuring point 301 to the measuring point 304, respectively. Further, a pressure difference pickup 333 is incorporated between the middles 306 and 305 of the upper and lower conduit. The pressure difference pickup 333 as is shown in FIG. 8, takes also up a value, which is equal to $\frac{1}{2}h_j + \frac{1}{2}h_k$. This measured value can control a control member 371 of a control device for automatically controlling the convey process.

It is true that a negligible quantity of the suspension flows from the pipe fraction $j$ through the upper and lower conduit to the pipe fraction $k$. If necessary this quantity can be calculated.

What I claim is:

1. A measuring device for determining the convey concentration of dredging spoil of a suspension of mainly dredging spoil and water flowing through a pipe comprising:

a substantially vertical first pipe fraction for conveying the flow substantially vertically upwards and a second substantially vertical pipe fraction in communication with said first pipe section for conveying the flow substantially vertically downwards, an upper and a lower conduit respectively connected between corresponding points on said first and second pipe fractions, and means for measuring the pressure difference between said upper and lower conduits.

2. The measuring device according to claim 1, further comprising a source of fluid purgative, first and second purgative conduit means respectively coupling said source to the upper ones of said points on said first and second pipe fractions, and third and fourth purgative conduit means respectively coupling said source to the lower ones of said points, said upper conduit coupling said first and second purgative conduit means, and said lower conduit coupling the third and fourth purgative conduit means.

3. The measuring device of claim 2, in which said pressure difference measuring means is connected between the midpoints of said upper and lower conduits.

4. The measuring device of claim 1, in which said pressure difference measuring means is connected between the midpoints of said upper and lower conduits.

References Cited

UNITED STATES PATENTS

| 1,697,867 | 1/1929 | Haultain | 73—438 |
| 2,287,027 | 6/1942 | Cummins, Jr. | 73—438 |
| 2,768,529 | 10/1956 | Hagler, Sr. | 73—438 |
| 3,175,403 | 3/1965 | Nelson | 73—438 |
| 3,473,401 | 10/1969 | Fajans et al. | 73—438 |

FOREIGN PATENTS

| 1,083,782 | 6/1954 | France | 73—438 |

LOUIS R. PRINCE, Primary Examiner

J. W. ROSKOS, Assistant Examiner

U.S. Cl. X.R.

73—438